W. GROTHE.
ELECTRIC BATTERY ANODE.
APPLICATION FILED MAY 15, 1916.
1,287,676.
Patented Dec. 17, 1918.
3 SHEETS—SHEET 2.
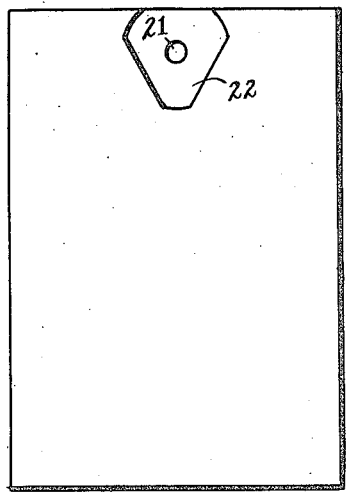
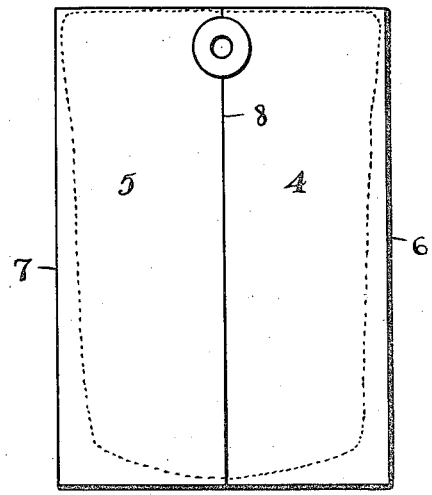
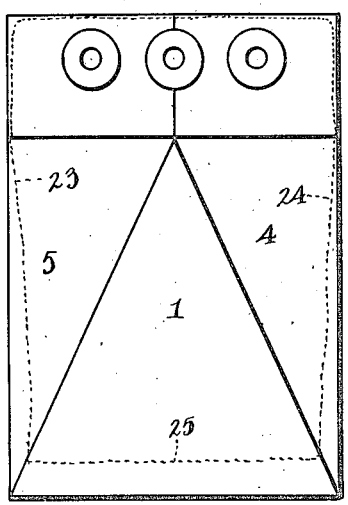
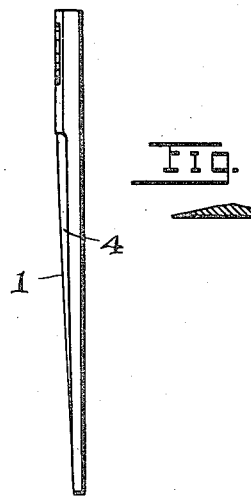
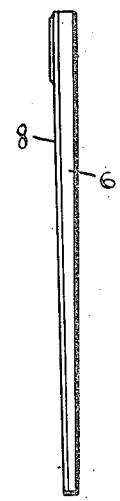
INVENTOR.
WALTER GROTHE
BY Ira J. Adams.
ATTORNEY

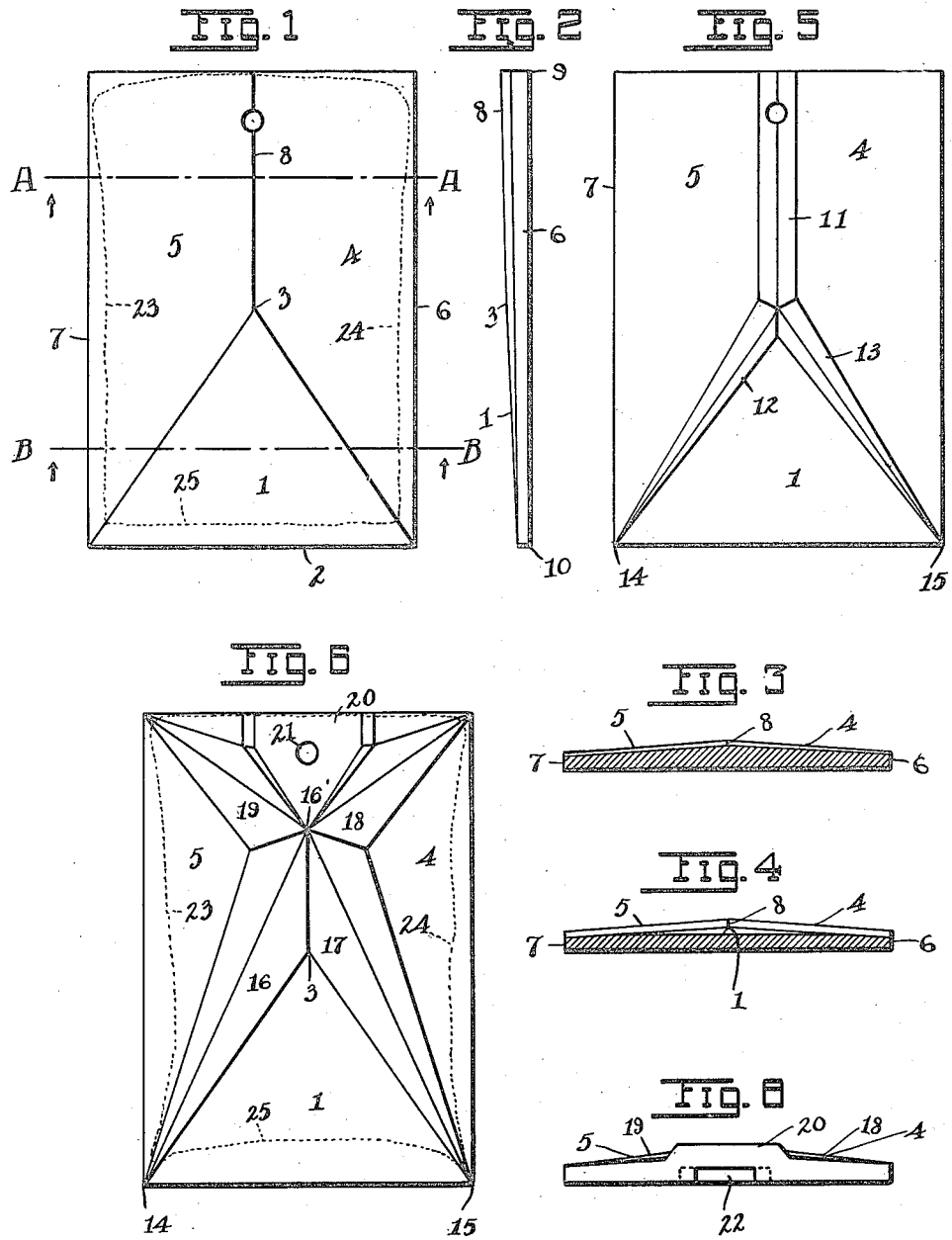

W. GROTHE.
ELECTRIC BATTERY ANODE.
APPLICATION FILED MAY 15, 1916.

1,287,676.

Patented Dec. 17, 1918.
3 SHEETS—SHEET 3.

INVENTOR.
WALTER GROTHE
BY Ira J. Adams
ATTORNEY

UNITED STATES PATENT OFFICE.

WALTER GROTHE, OF FREMONT, OHIO, ASSIGNOR, BY MESNE ASSIGNMENTS, TO NATIONAL CARBON COMPANY, INC., A CORPORATION OF NEW YORK.

ELECTRIC-BATTERY ANODE.

1,287,676.   Specification of Letters Patent.   Patented Dec. 17, 1918.

Application filed May 15, 1916. Serial No. 97,486.

*To all whom it may concern:*

Be it known that I, WALTER GROTHE, a citizen of the United States, residing at Fremont, in the county of Sandusky and State of Ohio, have invented a certain new and useful Improvement in Electric-Battery Anodes, of which the following is a full, clear, and exact description.

This invention relates to electric batteries, and while not limited thereto, it is particularly adapted to copper oxid cells with alkaline electrolyte.

It has been quite usual to make the zinc electrode of copper oxid cells in plate form with uniform thickness from side to side and gradually increasing thickness from bottom to top. With this construction the electrode, if made thin, dissolves in such a way as to let patches of zinc bulge toward the cathode or fall to the bottom of the jar, which in one case is liable to short circuit the cell and in the other results in a waste of zinc.

It also has been proposed to surround the plate with a thick integral frame joined transversely by strengthening ribs. The frame is designed to have sufficient metal to remain intact after the interior part of the plate has dissolved away and in this way it is intended that the frame hold the thin zinc patches from bulging or dropping off. Plates with the frame around the edges are hard to die-cast, as the mold holds the frame and prevents it from shrinking with the thin interior web as the zinc cools. This produces internal strains in the web that weaken the plate and quite frequently result in cracking. Such a plate also requires more zinc than is necessary to secure the desired results.

My invention is designed to overcome the above mentioned disadvantages.

Referring to the drawings:—

Figure 1 is a side view of the anode or positive plate in my improvement.

Fig. 2 is an edge view of the plate shown in Fig. 1.

Fig. 3 is a section taken on the line A—A of Fig. 1.

Fig. 4 is a section taken on the line B—B of Fig. 1.

Fig. 5 is a side view of the plate shown in Fig. 1 with strengthening veins to reinforce the plate.

Fig. 6 is a side view of the preferred form of plate.

Fig. 7 is a view of the reverse side of the plate illustrated in Fig. 6.

Fig. 8 is a top view of the plate shown in Figs. 6 and 7.

Fig. 9 illustrates the general shape of the strengthening veins shown in Figs. 5 and 6.

Fig. 10 is a modified form of plate without veins.

Fig. 11 is an edge view of the plate in Fig. 10.

Fig. 12 is a view of a further modification.

Fig. 13 is an edge view of the plate in Fig. 12.

Figure 14:
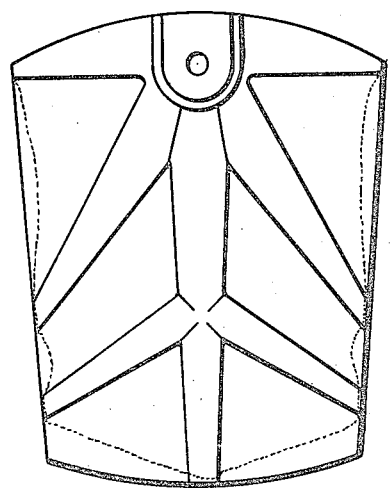
Fig. 14 is a view of a plate with a modified form of strengthening veins.
Figure 15:
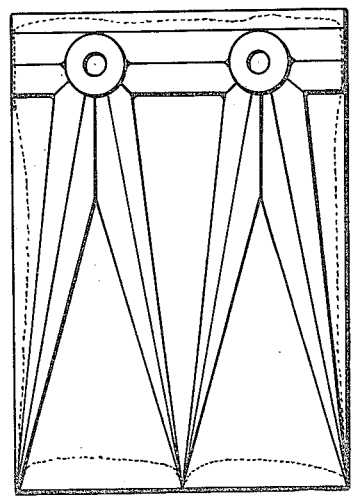
Fig. 15 shows a further modification of strengthening veins.

I have found that it is preferable to have no thickened frame at the edges. On the contrary, it is desirable to cut away or bevel the plate from the central portion toward the edges, so that the plates have thin edges. If two similar zinc plates of uniform thickness be selected and one used as a cell anode directly while the other is first beveled off from the central part to the edges and then similarly used as an anode, the former will dissolve away in an irregular manner and shed patches of zinc, while the latter will dissolve substantially uniformly with very little shedding if properly beveled. The beveling of the plate in this way not only reduces the amount of zinc used, but it also lengthens the life of the cell on account of less shedding of zinc and freedom from short circuits.

I prefer to construct the plates with a plurality of slanting or beveled portions on either one or both of its side surfaces. In the form shown in Figs. 1 and 2, the plate has a body portion of general inclination from the top to the bottom and integrally superposed on this are three other portions having maximum thickness at the interior. The portion 1 slants from the bottom edge 2 upward to the point 3 which is preferably approximately the center of the plate though this may be varied if desired. The two side portions 4 and 5 slant from the sides 6 and 7 respectively to the central line 8 in which the point 3 is located. With this arrangement the plate has a thin edge and gradually increases in thickness toward the central part.

The degree of taper may of course vary, depending upon circumstances, but I have found that good results are obtained with the following values in a 5"x7" rectangular plate. With respect to the bottom plane 9—10 (Fig. 2) all longitudinal lines in the surface of portions 4 and 5, that is, those drawn parallel to the sides of the plate 6 or 7, may have a pitch of about .005 to .006 of an inch per inch length. Any longitudinal line in the surface of portion 1 may have a pitch of about .012 to .014 of an inch per inch. Also, transverse lines in the surface of portion 5, that is, those extending in the direction of the top or bottom edge of the plate, may have a pitch of substantially .010 to .012 of an inch per inch. Obviously similar transverse lines in portion 4 have the same pitch but in the opposite direction.

With the pitch of the various planes equal to the figures given, I find that the zinc corrodes in such a way as to leave the interior of the plate intact, that is, the zinc is consumed at the edges of the plate faster than in any other interior portion. Consequently very little zinc is detached from the electrode during the life of the cell.

It must be understood that the pitch values given do not correspond exactly with the rates of corrosion in the various parts of the plate. In order to insure that the interior part of the plate will remain intact I have given pitch values greater than would correspond to such. The surfaces also should theoretically be curved, but molds for curved surfaces are difficult to make, so I approximate the theoretical surface by planes.

As a further precaution against shedding zinc, I prefer to employ strengthening veins 11, 12 and 13 (Fig. 5). The cross section of these veins may be rectangular, semicircular, etc., but I prefer to make them of triangular cross section as illustrated more or less diagrammatically in Fig. 9. I also find it advantageous to taper the veins 12 and 13 until they gradually merge into the surface of the plate at the corners 14 and 15 (Fig. 5).

The preferred form of electrode plate is illustrated in Fig. 6. The main body portion of the plate is built up of beveled portions 1, 4 and 5 in the same way as described in reference to the modification shown in Fig. 1. The triangular veins 16, 17, 18 and 19 are superposed integrally on either side, but preferably they should be placed on the side with the beveled surface so that a smooth side will be left to be placed next to the cathode to insure a uniform solution-gap. As shown in this figure, the lower veins 16 and 17 lie outside of the intersecting lines 3—14 and 3—15. However, this can be varied without departing from the spirit of the invention. The ridge lines of each of the four tapering veins meet or intersect at the point 16' in the central axis of the plate.

The strengthening veins are of triangular cross section, as diagrammatically shown in Fig. 9, and preferably taper off toward each of the four corners where they merge into the surface of the plate.

Figure 16:
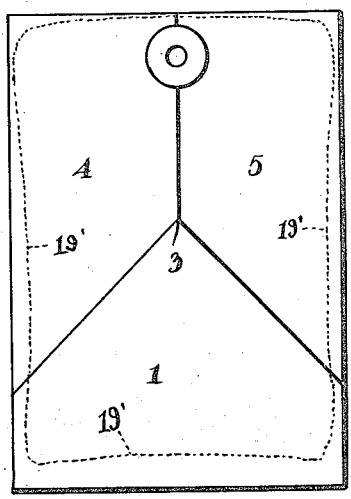
Fig. 16 is a modification of the general type of Fig. 1.
Figure 17:
Fig. 17 is an edge view of the plate shown in Fig. 16.

In Fig. 10 the plate is of wedge shape from top to bottom, and has two bevel portions superposed on this, that is, there is no lower bevel portion such as portion 1 of Fig. 1. In Fig. 16 there are three beveled portions 1, 4 and 5 as in Fig. 1, but the intersecting lines 3—14 and 3—15 of the bevels do not extend to the corners but meet the side lines above the same. The corrosion of this plate would be somewhat as indicated by the dotted lines 19'.

While the invention is capable of use with any type of battery, I prefer to use it in connection with the cell described in my co-pending application, Serial No. 76,235, filed February 5, 1916. When used in such a cell I place a reinforcing portion 20 at the upper part of the plate where it is to be attached to its support by means of a bolt passing through the hole 21. The reverse side of the zinc plate is recessed or countersunk at 22 to receive the support referred to. This is clearly shown in Figs. 7 and 8 of the drawings. Obviously other modes of support may be devised for plates involving the principal features of the invention, and by way of example I have shown different ways of making the connection in Figs. 5, 10, 12 and 14.

The strengthening veins may be variously arranged and a number of different modifications have been illustrated in the drawings. It will be apparent that such arrangements of interior veins, or any other, may be used with any of the variously beveled plates.

A plate constructed as shown in Fig. 6 dissolves away first at the edges, so that minimum trouble is experienced with the interior patches shedding off. As corrosion proceeds the edges of the plate in Figs. 1, 6 and 12 will assume more or less curved lines such as 23, 24 and 25, and when the cell is exhausted practically nothing will be left of the electrode but the central portion of the star shaped support formed by the strengthening veins. In Fig. 10 the plate will dissolve somewhat in accordance with the dotted line 26. For this reason it is preferable to use strengthening veins that do not extend to the corners, such as illustrated in Fig. 14 for instance.

Zinc plates made in accordance with my invention give a visual indication of the state of exhaustion and are substantially free from shedding of zinc. Consequently the life of cells employing such electrode is materially increased and the cost of zinc at the same time is reduced.

One important feature, in a plate constructed in accordance with my invention, is the ease with which it can be die-cast. There are no surrounding frame portions on the plate, so that when it cools the fine web portions can contract without restriction. Consequently the castings are free from cracks. Perfect zincs are thus assured in practically all cases.

There are various modifications that might be made in the invention, all of which properly come under the claims as equivalents of the parts disclosed herein. While it is advantageous to use triangular shaped veins that merge gradually into the surface of the plate, they nevertheless may be made of any other shape and need not necessarily merge into the surface.

In the specification I have referred to the plate as being made up of a body portion and two or more bevel portions superposed on it. This is a correct analysis of the plate and was used to facilitate the understanding of the invention, but it will be understood that the plate is cast as one integral piece. It also could, as a matter of fact, be milled, rolled or stamped from zinc plate.

Having described my invention, what I claim is:—

1. In electric batteries, a flat electrode plate having a side divided into a plurality of plane surfaces, each slanting upward from an outside edge toward an interior point.

2. In electric batteries, an electrode plate consisting of three integral portions having maximum thickness at a central part of the plate, two of said portions decreasing in thickness toward the opposite sides and the third portion decreasing in thickness toward the bottom, whereby the sides and bottom will be the first to be dissolved away by the electrochemical action.

3. In electric batteries, an electrode plate consisting of a body portion diminishing in thickness from top to bottom and a plurality of bevel portions superposed integrally onto said body portion, said bevel portions slanting from a central part of the plate toward the outside edges.

4. In electric batteries, an electrode plate consisting of three portions having the maximum thickness at a central part of the plate, two of said portions decreasing in thickness toward the opposite side and the third portion decreasing in thickness toward the bottom, and strengthening veins extending along the intersecting lines of said portions.

5. In electric batteries, an electrode plate consisting of a body portion diminishing in thickness from top to bottom and having a plurality of bevel portions superposed integrally onto said body portion, said bevel portions slanting from a central part of the plate toward the outside edges, and strengthening veins extending along the intersecting line of said bevel portions.

6. In electric batteries, an electrode consisting of a wedge shaped plate with three portions superposed thereon, having maximum thickness at the central part of the plate, two of said portions decreasing in thickness toward opposite sides and the third portion decreasing in thickness toward the bottom.

7. In electric batteries, a plate electrode having strengthening veins extending to the four corners thereof.

8. In electric batteries, a thin electrode plate having strengthening veins extending from an interior point toward certain of the corners and gradually merging into the surface of the plate.

9. In electric batteries, a positive plate electrode having strengthening veins of triangular cross section, the altitude of said triangle being small as compared with the base.

10. In electric batteries a positive plate having tapering strengthening veins extending across the surface, said veins being triangular in cross section.

11. In electric batteries, an electrode plate consisting of a body portion diminishing in thickness from top to bottom and two bevel portions superposed integrally onto said body portion, said bevel portions slanting from a central part of the plate to the sides thereof.

12. In electric batteries, an electrode plate consisting of a body portion diminishing in thickness from top to bottom, one of the sides of said body portion being beveled from a central part to the bottom, and two of the intersecting lines of said bevel portions joining the side edges at a point above the two lower corners, whereby said corners will be consumed first in the electrolytic action.

In testimony whereof, I hereunto affix my signature.

WALTER GROTHE.